(12) United States Patent
Rabinowitz

(10) Patent No.: US 6,975,445 B1
(45) Date of Patent: Dec. 13, 2005

(54) DYNAMIC OPTICAL SWITCHING ENSEMBLE

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 0 days.

(21) Appl. No.: 10/862,708

(22) Filed: Jun. 7, 2004

(51) Int. Cl.[7] .......................... G02B 26/00; G02B 5/08; G02B 6/26; G09G 3/34
(52) U.S. Cl. .................. 359/296; 359/291; 359/851; 345/85; 345/107; 385/18
(58) Field of Search ................................ 359/296, 290, 359/291, 851, 951; 345/85, 107, 105, 108; 385/18, 16, 17; 224/172, 173

(56) References Cited

U.S. PATENT DOCUMENTS

| | | | | |
|---|---|---|---|---|
| 6,421,035 B1 * | 7/2002 | Sheridon et al. | .............. | 345/85 |
| 6,587,611 B1 * | 7/2003 | Hunt | ........................... | 385/18 |
| 6,612,705 B1 * | 9/2003 | Davidson et al. | ............ | 359/851 |
| 6,698,693 B2 * | 3/2004 | Davidson et al. | ............ | 244/173 |
| 6,738,176 B2 * | 5/2004 | Rabinowitz et al. | ........ | 359/296 |
| 6,847,347 B1 * | 1/2005 | Kazmaier et al. | ............ | 345/107 |

\* cited by examiner

*Primary Examiner*—Loha Ben

(57) ABSTRACT

This invention deals with an improveed general concept for a multi-wavelength switching ensemble which is controlled electrically, electromagetically, or magnetically. A switching system is presented that permits the input to control the output. It allows a full 360 degree rotation of the beam which greatly exceeds the rotational capability of conventional systems. Furthermore, the instant invention permits less costly and greater ease of manufacture.

20 Claims, 6 Drawing Sheets

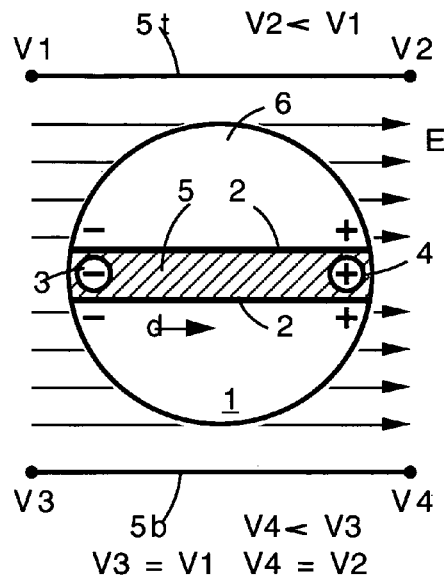
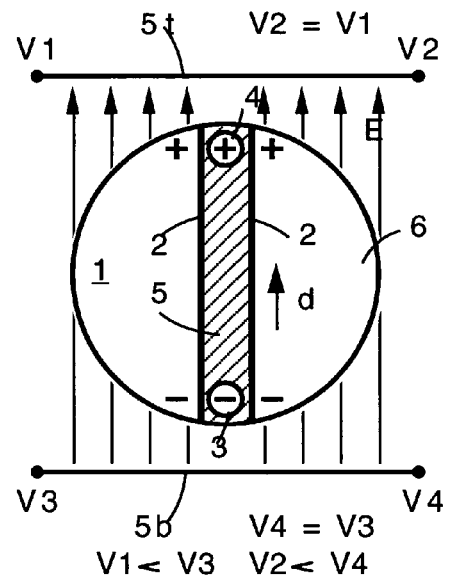
Fig. 1a    Fig. 1b
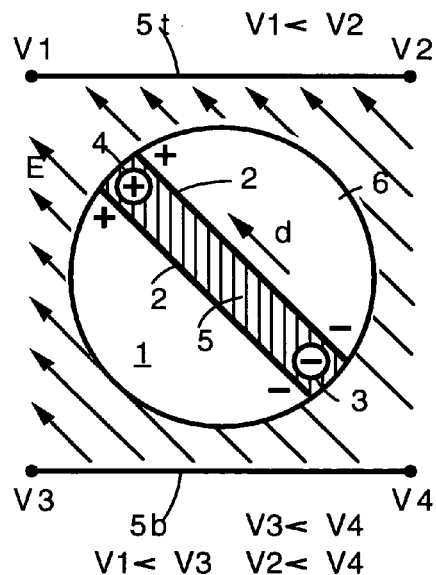
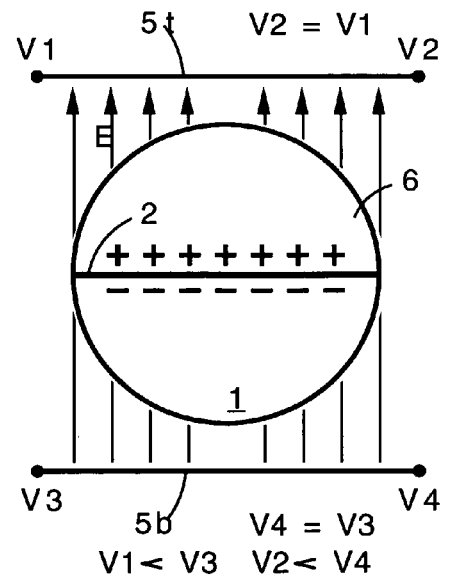
Fig. 1c    Fig. 1d

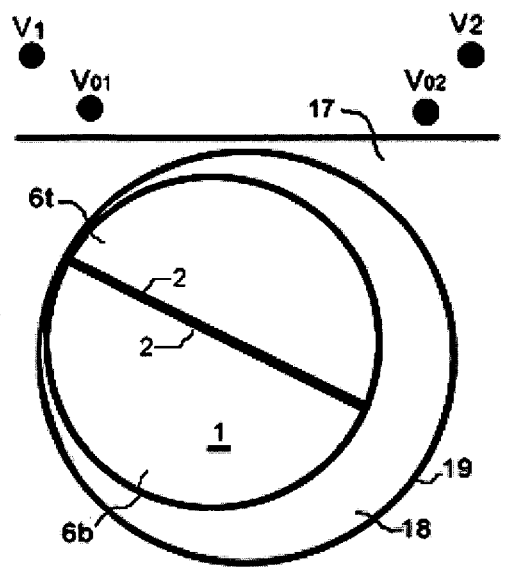
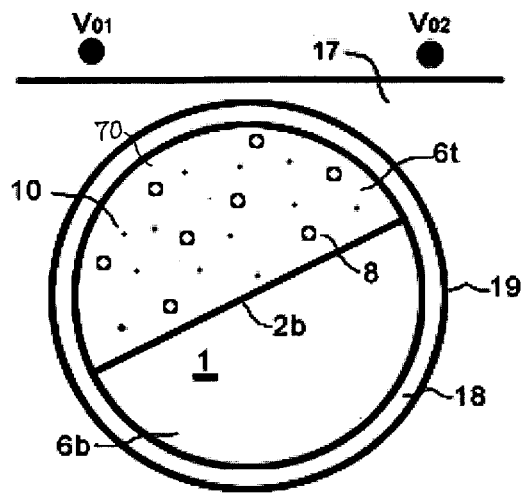
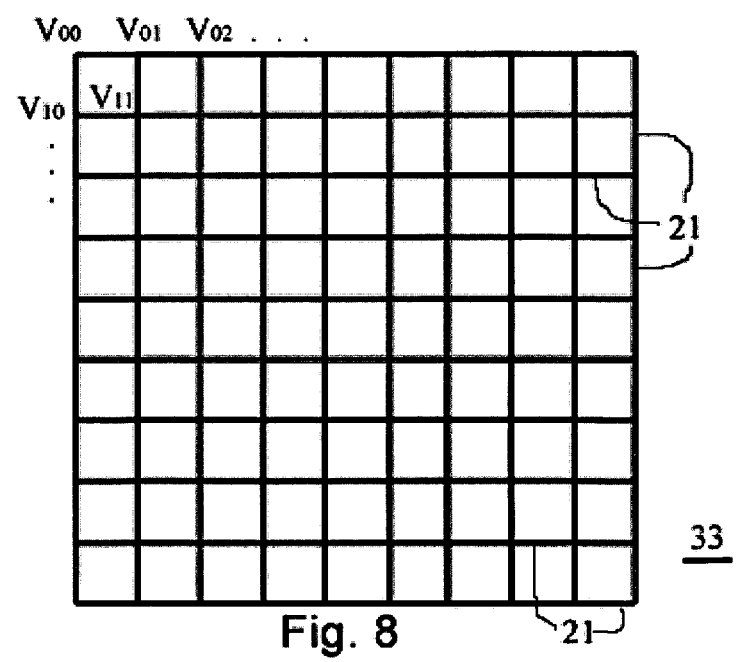
Fig. 7
Fig. 9
Fig. 8

DYNAMIC OPTICAL SWITCHING ENSEMBLE

INCORPORATION BY REFERENCE

The following owned in common U.S. patents, allowed patent applications, and pending patent applications are fully incorporated herein by reference:
1. U.S. Pat. No. 6,738,176, by Mario Rabinowitz and Mark Davidson, "Dynamic Multi-Wavelength Switching Ensemble" issued on May 18, 2004.
2. U.S. Pat. No. 6,612,705, by Mark Davidson and Mario Rabinowitz, "Mini-Optics Solar Energy Concentrator" issued on Sep. 2, 2003.
3. U.S. Pat. No. 6,698,693 by Mark Davidson and Mario Rabinowitz, "Solar Propulsion Assist" issued on Mar. 2, 2004.
4. U.S. Publication #2003-0193726-A1, by Mark Davidson and Mario Rabinowitz, "Active Reflection, Illumination, and Projection" published on Oct. 16, 2003.
5. U.S. Publication #Not Designated Yet, by Mario Rabinowitz, "Spinning Concentrator Enhanced Solar Energy Alternating Current Producton" is Pending.
6. U.S. Publication #Not Designated Yet, by Mario Rabinowitz, "Manufacturing Transparent Mirrored Mini-Balls for Solar Energy Concentration and Analogous Applications" is Pending.
7. U.S. Publication #Not Designated Yet, by Mario Rabinowitz, "Advanced Micro-Optics Solar Energy Collection System" is Pending.
8. U.S. Publication #Not Designated Yet, by Mario Rabinowitz, "Alignment of Solar Concentrator Micro-Mirrors" is Pending.
9. U.S. Publication #Not Designated Yet, by Mario Rabinowitz and Felipe Garcia, "Group Alignment Of Solar Concentrator Micro-Mirrors" is Pending.
10. U.S. Publication #2004-0021964-A1, by Mario Rabinowitz and Mark Davidson "Mini-Optics Solar Energy Concentrator" allowed for issuance.
11. U.S. Publication #Not Designated Yet, by Mario Rabinowitz and David V. Overhauser, "Manufacture and Apparatus for Nearly Frictionless Rotatable Array of Micro-Mirrors in a Solar Concentrator Sheet" is Pending.
12. U.S. Publication #Not Designated Yet, by Mario Rabinowitz, "Improved Micro-Optics Solar Energy Concentrator" is Pending.

BACKGROUND OF THE INVENTION

Field of the Invention

The instant invention relates to an improved optical switching ensemble which performs switching operations by electrically, electromagetically, or magnetically controlling the direction of an electromagnetic beam, from optical wavelengths through microwave wavelengths. It incorporates a novel means for rotational control as well as greater aiming accuracy in permitting the input to control the output. In the instant invention the micro-mirrors can be either pre-formed (pre-existing), or formable in-situ. Applications include signal switching, digital imaging, printing, bar code reading, optical recording systems, surface inspection systems, etc.

The present invention allows a full 360 degree rotation of the beam which greatly exceeds the rotational capability of conventional systems. In fact, the mirrored balls can be made to spin about any axis as described in detail in the co-pending patent application, "Spinning Concentrator Enhanced Solar Energy Alternating Current Producton" mentioned above in the list of incorporated references. Thus it can have a number of ancillary sensing functions such as in gyroscopes that sense a rate of rotation by sensing the effects of a Coriolis force on an oscillating body.

Definitions

"Bipolar" refers herein to either a magnetic assemblage with the two poles north and south, or an electric system with + and − charges separated as in an electret.

"Collimated" refers herein to an approximately parallel beam of light.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"ITO" is a thin conducting alloy of Indium/Tin Oxide that is transparent.

"Plasticizer" as used herein refers specifically to a dielectric plasticizer fluid that is absorbed by an elastomer thereby causing it to swell thus creating a spherical shell around each of the micro-mirror balls which do not substantially absorb the plasticizer. More commonly plastizers are added to a material to make it softer, more flexible, or more moldable.

"Polar gradient" as used herein relates to magnetic reflecting elements that are controlled by a magnetic field gradient mode.

"Monopolar" as used herein denotes mono-charged reflecting elements that are controlled in an electrophoretic mode.

"Multi-wavelength" as used herein denotes the scalability of the instant invention over a range of different wavelength-region-specific embodiments which could operate collectively over a range of the electromagnetic spectrum. This wavelength range extends from the visible ~$400 \times 10^{-9}$ m to the microwave region ~30 cm.

"Plasticizer" as used herein refers specifically to a dielectric plasticizer fluid that is absorbed by an elastomer thereby causing it to swell thus creating a spherical shell around each of the micro-mirror balls which do not substantially absorb the plasticizer. More commonly plastizers are added to a material to make it softer, more flexible, or more moldable.

"Rayleigh limit" relates to the optical limit of resolution which can be used to determine the smallest size of the elements that constitute a mini-mirror. Lord Rayleigh discovered this limit from a study of the appearance of the diffraction patterns of closely spaced point sources.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light, among other reasons.

"Spin glass" refers to a wide variety of materials which contain interacting atomic magnetic moments. They possess a form of disorder, in which the magnetic susceptibility undergoes an abrupt change at what is called the freezing temperature for the spin system.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Translucent" as used herein refers to materials that pass or transmit light of only certain wavelengths so that the transmitted light is colored.

"Van der Waals force" as used herein refers to an attrative force between atoms or molecules. It can arise because a fluctuating dipole moment in one molecule induces a dipole moment in the other. The two dipole moments then attract.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

There are many aspects and applications of this invention, which provides techniques applicable individually or in combination for a novel multi-wavelength optical switching ensemble which controls the direction in which an electromagnetic radiation signal-beam proceeds to perform switching operations, and to a method of operating the optical switch. This ensemble can operate from optical through microwave wavelengths by electrical, electromagnetic, or magnetic activation, permitting a full unimpeded 360 degree rotation of the beam. Primarily this invention deals with the broad general concept of method and apparatus for two-axis mirror rotation of an electromagnetic beam to perform switching operations by any or several kinds of actuators. As will be described in detail, these objectives may be accomplished by any of a number of ways separately or in combination, as taught by my invention.

It is a general object of this invention to provide a dynamic switching system for electromagnetic beams that operates by reflection.

Another object is to provide an active reflection switching system.

Another aspect is to provide a novel low-cost wide-spectrum electromagnetic beam switching system.

It is an aspect of the present invention to provide a single sheet within which each micro-mirror may be aligned with high accuracy as part of an active reflection switching system.

It is another object of the present invention to provide a single sheet within which each micro-mirror may rotate in an almost frictionless encapsulation as part of an active reflection switching system.

An aspect of this invention is to provide apparatus for nearly frictionless rotation of micro-mirrored balls i.e. spheres or cylinders.

It is a further aspect of the present invention to achieve an active reflection switching system that can incorporate a range of micro-mirrored ball sizes.

Other objects and advantages of the invention will be apparent in a description of specific embodiments thereof, given by way of example only, to enable one skilled in the art to readily practice the invention singly or in combination as described hereinafter with reference to the accompanying drawings.

BRIEF DESCRIPTION OF THE DRAWINGS

FIG. 1a is a cross-sectional view of a rotatable element with an electret dipole sandwiched between induced dipole micro-mirrors aligned parallel to partitioned electrodes where an ensemble of such elements are a major constituent of an optical switching ensemble.

FIG. 1b is a cross-sectional view of a rotatable element with an electret dipole sandwiched between induced dipole micro-mirrors aligned perpendicular to partitioned electrodes where such elements are a major constituent of an optical switching ensemble.

FIG. 1c is a cross-sectional view of a rotatable element with an electret dipole sandwiched between induced dipole micro-mirrors aligned at a tilted angle with respect to partitioned electrodes where such elements are a major constituent of an optical switching ensemble.

FIG. 1d is a cross-sectional view of a rotatable element that does not use an electret, showing an induced dipole micro-mirror in an unstable positon of being perpendicular to the applied electric field. From this unstable position it will rotate to an alignment in which the plane of the mirror is aligned in the direction of the applied field. An ensemble of such elements are a major constituent of an optical switching ensemble.

FIG. 7 is a cross-sectional view of a rotatable element, with an induced dipole micro-mirror, in a holding mode between alignments.

FIG. 8 is a schematic top view showing an electronic control grid for rotating the reflecting elements of an optical switching ensemble.

FIG. 9 is a cross-sectional view of a mirrorable cell filled with dispersed electric or ferromagnetic particles.

DETAILED DESCRIPTION OF THE PRESENTLY PREFERRED EMBODIMENTS

Figure 2A:
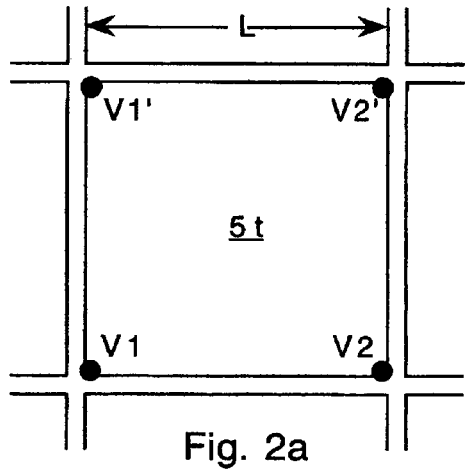
FIG. 2a represents a top view of an array of partitioned highly resistive electrodes showing in detail a top view of one such electrode and the voltages at its four corners.

As is described here in detail, the objectives of the instant invention may be accomplished by any of a number of ways separately or in combination, as taught by my invention FIG. 1*a* is a cross-sectional view of a rotatable element 1 with an electret dipole 5 with negative charge 3 at one end and positive charge 4 at the other end sandwiched between micro-mirrors 2 aligned parallel to top partitioned highly resistive electrode 5*t* and bottom partitioned highly resistive electrode 5*b*, where an ensemble of such elements and electrodes are a major constituent of an optical switching ensemble. The micro-mirrors 2 are shiny circular flat conducting metal close to the equatorial plane of the elements 1. The partitioned electrodes and other types of electrodes are discussed in conjunction with FIGS. 2*a*, 2*b*, 2*c*, and 2*d*. A micro-processor sends signals via bus bars to establish voltages from a power supply to each partitioned electrode which is made of a highly resistive thin transparent conductor such as an alloy of indium tin oxide (ITO). For top partitioned electrode 5*t*, the left corner is at voltage V1 and the right corner is at voltage V2. For bottom partitioned electrode 5*b*, the left corner is at voltage V3 and the right corner is at voltage V4. A signal sets the voltages so that V3=V1, V4=V2, V2<V1, and V4<V3, to produce an approximately uniform applied electric field E parallel to the electrodes 5*t* and 5*b* as shown.

The applied electric field E induces a dipole moment in the metallic conducting material of the micro-mirrors 2. This is because when a metallic conductor is placed in an electric field, the charge distributes itself so as to produce a field free region inside the conductor. To internally cancel the applied field E, negative, −, free electrons move to the end of each conducting micro-mirror 2 opposite to the direction of E, leaving positive + charge at the end in the direction of E. The torque interaction of the induced electric dipole moment of the micro-mirrors 2 and the electric field E acts to align the micro-mirrors 2 parallel to the electric field E as shown here in FIG. 1. The torque is proportional to the product of E and the dipole moment.

An electret 5 is used to augment the torque. In equilibrium i.e. when the rotation is complete, the polarization due to the electret 5 and that due to the induced charges of the conducting micro-mirrors 2 add together to produce a total dipole moment d parallel to the micro-mirrors 2, and parallel to the applied electric field E. The positive + end 4 and the negative − end 3 of the electret 5 align themselves parallel to the electric field E due to the torque interaction of the permanent electric dipole moment of the electret 5 and the applied electric field E, which is proportional to their product. Since the electret 5 and its dipole moment are parallel to the micro-mirrors 2, this torque interaction aligns the micro-mirrors 2 parallel to the applied electric field E.

The presence of the electret 5, enhances the torque. In the absence of the electret 5, the dipole moment induced in the micro-mirrors 2 can be sufficient to produce alignment. However, the additional torque provided by the electret 5 helps to overcome frictional effects. In this embodiment, the hemispheres 6 are made of the same transparent material which minimizes the effect of the zeta potential.

In operating by means of an induced polarization dipole field, the instant invention operates by a substantially different mechanism than in Gyricon displays. The instant invention also differs substantially from Gyricon displays in terms of the axis of symmetry of the elements 1, i.e. the balls or cylinders. In Gyricon displays, the axis of symmetry of their balls and cylinders is parallel to the applied electric field since the zeta potential dipole is parallel to the applied electric field. In the instant invention, the axis of symmetry of the elements 1 is perpendicular to the applied electric field because the micro-mirrors 2 and hence the induced polarization dipole field is perpendicular to the axis of symmetry. It should be noted that here in FIG. 1*a*, the electric field E orientation is at right angles to that which is used in Gyricon displays. Here E is parallel to the equatorial plane of the balls and the top surface 5*t* which admits light. In traditional Gyricon displays, E is perpendicular to the Gyricon ball equatorial plane and to the top surface—the viewing surface which admits light.

FIG. 1*b* is a cross-sectional view of a rotatable element 1 with an electret dipole 3 sandwiched between induced dipole micro-mirrors 2 aligned perpendicular to top partitioned highly resistive electrode 5*t* and bottom partitioned highly resistive electrode 5*b*, where an ensemble of such elements and electrodes are a major constituent of an optical switching ensemble. For top partitioned electrode 5*t*, the left corner is at voltage V1 and the right corner is at voltage V2. For bottom partitioned electrode 5*b*, the left corner is at voltage V3 and the right corner is at voltage V4. A signal sets the voltages so that V2=V1, V4=V3, V1<V3, and V2<V4, so that an approximately uniform applied electric field E is produced perpendicular to the electrodes 5*t* and 5*b* as shown. The micro-mirrors 2 align themselves parallel to the applied electric field E due to the induced dipole field polarization of the mirrors, and permanent dipole of the electret 5.

FIG. 1*c* is a cross-sectional view of a rotatable element 1 with an electret dipole 5 sandwiched between induced dipole micro-mirrors 2 aligned at a tilted angle with respect to top partitioned highly resistive electrode 5*t* and bottom partitioned highly resistive electrode 5*b*, where an ensemble of such elements and electrodes are a major constituent of an optical switching ensemble. For top partitioned electrode 5*t*, the left corner is at voltage V1 and the right corner is at voltage V2. For bottom partitioned electrode 5*b*, the left corner is at voltage V3 and the right corner is at voltage V4. A signal sets the voltages so that V1<V2, V3<V4, V1<V3, and V2<V4, so that an approximately uniform applied electric field E is produced that is tilted with respect to to the electrodes 5*t* and 5*b* as shown. The micro-mirrors 2 align themselves parallel to the electric field E due to the induced dipole field polarization of the mirrors, and permanent dipole of the electret 5. For balls, two-axis rotation is possible by additional alignment of the micro-mirrors 2 out of the plane of the paper. This is accomplished by similar voltage relationships to those already described as can be understood from the top and bottom electrode views shown in FIGS. 2a–2d. Cylinders would be restricted to single-axis rotation.

Figure 4:
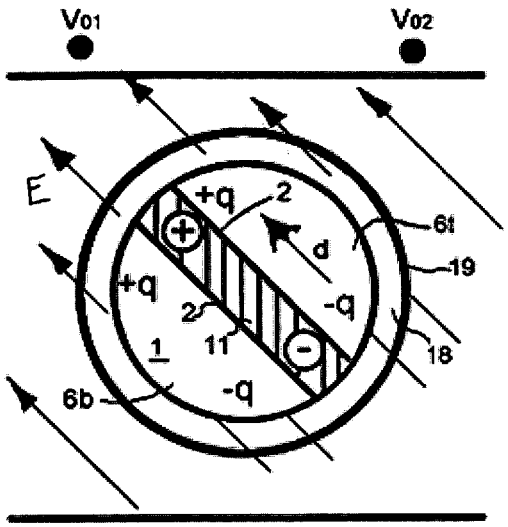
FIG. 4 is a cross-sectional view of a rotatable element with an electret dipole sandwiched between induced dipole micro-mirrors aligned at a tilted angle with respect to partitioned electrodes where an ensemble of such elements are a major constituent of an optical switching ensemble.

FIG. 1d is a cross-sectional view of a rotatable element 1 showing an induced dipole micro-mirror 2 which relies soley on the induced polarization dipole field to produce alignment because the electret 5 is not used in this embodiment. The micro-mirror 2 can be either one-sided or preferably two-sided so that the optical switching ensemble can have either side up, or rotate the micro-mirror 2 a full 360 degrees if desired. The angular orientatons possible are similarly achieved as in FIGS. 1a, 1b, and 1c and so are not shown since these figures can be easily visualized without an electret 5. As shown here in FIG. 4, with V2=V1, V4=V3, V1<V3, and V2<V4, an approximately uniform electric field E is produced perpendicular to the electrodes 5t and 5b as shown. What is shown here in FIG. 4 is an unstable position of the mirror 2 perpendicular to the applied field E. From this unstable position the mirror 2 will rotate to an alignment in which the mirror is parallel to any direction of the applied field. An ensemble of such elements are a major constituent of an optical switching ensemble.

Examples of materials that are appropriate transparent dielectrics for making the elements 1 are: glass, polycarbonate, acrylic polymers made from acrylic derivatives such as acrylic acid, methacrylic acid, ethyl acrylate, methyl acrylate (some trade names are lexan, lucite, plexiglass, etc.). Electrets may be made from teflon, castor wax, carnuba wax, and other materials. A conducting, but highly resistive material like Indium/Tin Oxide (ITO) can be sputtered on the sheets that contain the elements 1 to form the addressing electrodes. The optical transparency of ITO makes it ideally suited for addressing the balls.

Let us now look at various possible embodiments of the instant invention for the addressing electrodes. The different configurations shown, and combinations of them can operate to align the elements 1 as a major constituent of an optical switching ensemble.

FIG. 2a represents a top view of an array of partitioned highly resistive electrodes with grid spacing L showing in detail a top view of one such electrode 5t and the voltages at its four corners. Voltages V1 and V2 correspond to voltages V1 and V2 shown in the cross sectional FIGS. 1a, 1b, 1c, and 1d. Voltages V1' and V2' are the voltages at the corners of this top electrode 5t below the plane of the paper of FIGS. 1a, 1b, 1c, and 1d. Each partitioned electrode is made of a highly resistive thin transparent conductor such as an alloy of indium tin oxide (ITO).

Figure 2B:
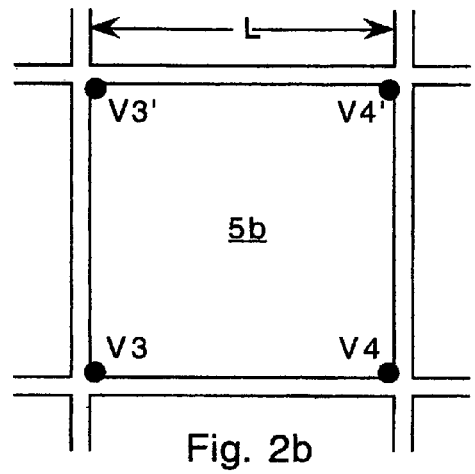
FIG. 2b represents a bottom view of an array of partitioned highly resistive electrodes showing in detail a view of a bottom electrode and the voltages at its four corners.

FIG. 2b represents a bottom view of an array of partitioned highly resistive electrodes with grid spacing L showing in detail a view of a bottom electrode 5b and the voltages at its four corners. Voltages V3 and V4 correspond to voltages V3 and V4 shown in the cross sectional FIGS. 1a, 1b, 1c, and 1d. Voltages V3' and V4' are the voltages at the corners of this bottom electrode 5b below the plane of the paper of FIGS. 1a, 1b, 1c, and 1d.

Figure 2C:
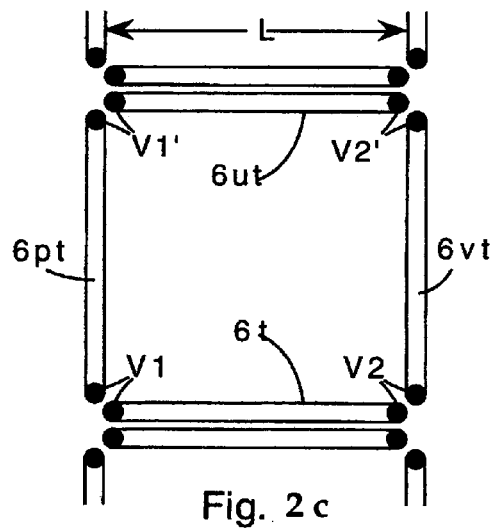
FIG. 2c represents a top view of an array of fragmented highly resistive wire electrodes showing in detail a top view of a set of four such adjacent electrodes and the voltages at their ends.

FIG. 2c represents a top view of an array of fragmented highly resistive wire electrodes with grid spacing L showing in detail a top view of a set of four such adjacent electrodes and the voltages at their ends. At the top, wire electrode 6t has voltages V1 and V2 at its ends which correspond to voltages V1 and V2 shown in the cross sectional FIGS. 1a, 1b, 1c, and 1d. Wire electrode 6pt is a wire perpendicular to the plane of the paper of FIGS. 1a, 1b, 1c, and 1d with voltages V1 and V1' at its ends. Wire electrode 6vt is a vertical wire with respect to the plane of the paper of FIGS. 1a, 1b, 1c, and 1d with voltages V2 and V2' at its ends. Wire electrode 6ut has voltages V1' and V2' at its ends, and is under the top electrode 6t. Each fragmented wire electrode is made of a highly resistive thin transparent conductor such as an alloy of indium tin oxide (ITO).

Figure 2D:
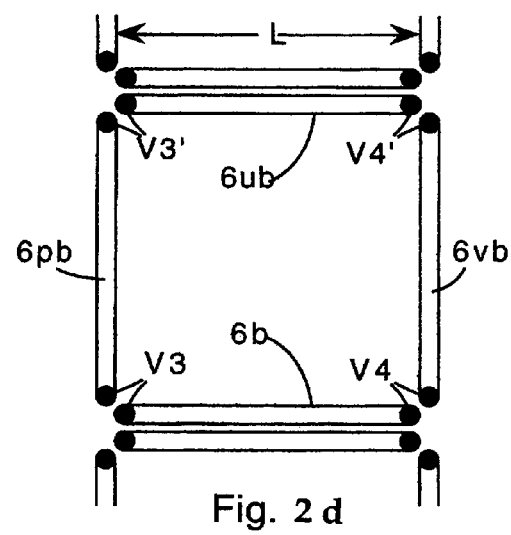
FIG. 2d represents a bottom view of an array of fragmented highly resistive wire electrodes showing in detail a bottom view of a set of four such adjacent electrodes and the voltages at their ends.

FIG. 2d represents a bottom view of an array of fragmented highly resistive wire electrodes with grid spacing L showing in detail a bottom view of a set of four such adjacent electrodes and the voltages at their ends. At the bottom, wire electrode 6b has voltages V3 and V4 at its ends which correspond to voltages V3 and V4 shown in the cross sectional FIGS. 1a, 1b, 1c, and 1d. Wire electrode 6pb is a wire perpendicular to the plane of the paper of FIGS. 1a, 1b, 1c, and 1d with voltages V3 and V3' at its ends. Wire electrode 6vb is a vertical wire with respect to the plane of the paper with voltages V4 and V4' at its ends. Wire electrode 6ub has voltages V4 and V4' at its ends, and is under electrode 6b.

Operational Modes

Let us consider various combinations of the electrodes and their advantages and disadvantages. The partioned electrodes 5t and 5b of FIGS. 2a and 2b may be operated as a pair. The advantage of doing this is that the most approximately uniform electric fields may thus be created here with only a negligible amount of fringing fields at the edges. A disadvantage of this configuration is that it has the smallest optical transparency since the incident light must be transmitted and reflected through each partitioned electrode of, for example, transparent ITO.

Operating the fragmented wire electrodes of FIGS. 2c and 2d as a pair has the advantage of providing the greatest transparency since the wire electrodes have a small cross section with most of the light passing between them. Thus a larger percentage of the incident light will be reflected to the receiver. A disadvantage of this configuration is that it produces the least uniform electric fields. Yet because of the symmetry the components of the field that diverge from uniformity cancel, and a main component remains to align the elements (balls and cylinders) in the same direction as would be provided by the corresponding uniform electric field that partioned electrodes would produce. This configuration has the further advantage that when the top side becomes worn or soiled, this configuration can be turned over so the pristine bottom side can be used on top with a high transparency to the incident and reflected light. Both the two-mirror embodiment of FIGS. 1a, 1b, and 1c, and the two-sided single mirror embodiment of FIG. 1d can be operated with either side up, as well as rotating the mirror(s) a full 360 degrees if needed.

The presently preferred configuration is the fragmented wire electrodes of FIG. 2c on top to receive the light, combined with the partioned electrodes of FIG. 2b on the bottom so that the combination more closely approximates the desired uniform electric field. With the fragmented wire electrodes configuration on top, the same large percentage of the incident light will be reflected to the receiver as for the configuration of fragmented wire electrodes on both top and bottom.

Figure 3:
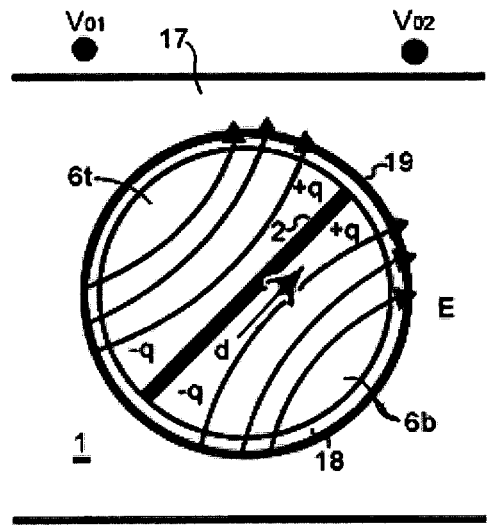
FIG. 3 is a cross-sectional view of a rotatable element with an induced dipole micro-mirror aligned at a tilted angle with respect to the surface of the single transparent sheet confining sheet. An ensemble of such elements are a major constituent of an optical switching ensemble.

FIG. 3 is a cross-sectional view of a rotatable element 1 with an induced dipole micro-mirror 2 aligned at a tilted angle with respect to the top surface of a single transparent sheet 17. The element 1 has a transparent top hemisphere (or hemicylinder) 6t, and a bottom hemisphere (or hemicylinder) 6b that may be either transparent or opaque. It is necessary for the top hemisphere 6t to be transparent for light to enter and be reflected from micro-mirror 2. The bottom hemisphere 6b may be opaque, preferably with dielectric properties similar to top hemisphere 6t to minimize the effect of the zeta potential.

The induced dipole moment d of the micro-mirror 2, with induced charges +q and −q at its ends, is shown parallel to the main components of the applied electric field E. When the electric field E is produced by grid wires rather than slabs (segmented electrodes) it is less uniform as shown. The electric field is produced by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

The element 1 is completely encompassed with a lubricating fluid 18 which is encapsulated inside a concentric cavity 19 in the sheet 17. Thus the confined and lubricated element 1 can make a nearly frictionless rotation, with hardly any undesirable displacement. An ensemble of such elements can thus be aligned as a group with the application of moderate power. It is preferable to utilize a liquid 18 whose index of refraction matches the clear hemisphere or clear hemicylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation. The manufacture of the concentric cavity 19 with lubricating fluid 18 is described in detail in the co-pending patent application, "Manufacture and Apparatus for Nearly Frictionless Rotatable Array of Micro-Mirrors in a Solar Concentrator Sheet" given in the list of incorporated references.

Mirrors are normally made of a conductive metallic coating. In an applied electrostatic field, E, a dipole moment is induced in the metallic conducting material of the micromirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a pivoted conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

If alignment is attempted in a conventional manner such as is used in Gyricon displays, the induced polarization electric dipole field in a mirror presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field parallel to the axis of symmetry when a sphere is made from two dielectrically different hemispheres due to their interaction with the fluid surrounding it. The induced dipole moment in a mirror is perpendicular to the axis of symmetry. One way to eliminate or greatly diminish the effect of the zeta potential is to make the surface of both hemispheres out of the same material. This would be quite difficult for Gyricon displays because they require optically different surfaces e.g. black and white, or e.g. cyan, magenta, and yellow for color mixing.

FIG. 4 is a cross-sectional view of a rotatable element 1 with an electret dipole 11 sandwiched between induced dipole micro-mirrors 2 aligned at a tilted angle with respect to the top transparent surface of a single sheet 17, where an ensemble of such elements are a major constituent of an optical switching ensemble.

The element 1 of top 6t and bottom 6b is completely covered with a lubricating fluid 19 which is encapsulated inside a concentric cavity 19. The induced dipole moment d of the micro-mirror 2, with induced charges +q and −q at its ends, is shown parallel to a uniform applied electric field E. When the electric field E is produced by slabs (segmented electrodes) rather than grid wires, it is more uniform as shown. The electric field is produced by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

In the electric orientation mode of control, the induced and/or permanent electric dipole d in each ball is acted on by a torque τ, equal to the vector product of the electric dipole moment d, of the dipole and the electric field E:

$$\tau = d \times E$$

which has the magnitude dE sin θ, where θ is the angle between the d and E vectors. If there is no other torque acting on the ball and friction is negligible, the ball will come to rest at the null torque orientation where the vectors d and E are parallel, and the dipole moment lines up with the electric field in equilibrium.

In the instant invention, no problem arises by making both hemispheres 6t and 6b out of the same transparent material to eliminate or minimize the zeta potential. In fact this presents an opportunity to both utilize the mirror induced polarization electric dipole field and to have two mirror surfaces. With two mirror surfaces, an option presents itself to use the better surface as the surface that reflects the light, and furthermore to have a standby mirror in each element should one of the mirrors degrade. As shown, a permanent electret dipole 11 is sandwiched between the two induced dipole mirrors 2 to further enhance the dipole field d that interacts with the addressable alignment fields.

A signal sets the voltages so that $V_{o1} < V_{o2}, V'_{o1} < V'_{o2}$, $V_{o1} < V'_{o1}$, and $V_{o2} < V'_{o2}$, an approximately uniform applied electric field E is produced that is tilted with respect to to the top surface of sheet 17 as shown. The micro-mirrors 2 align themselves parallel to the electric field E due to the induced dipole field polarization of the mirrors, and permanent dipole of the electret 11. For balls, two-axis rotation is possible by additional alignment of the micro-mirrors 2 out of the plane of the paper. This is accomplished by similar voltage relationships to those already described. Cylinders would be restricted to single-axis rotation. The chosen alignment angle i.e. tilt angle of the rotatable elements 1 can be held in place by any of a number of methods to be described in conjunction with FIGS. 6 and 7. Thus during the interval between alignments, the alignment voltages may be switched off to conserve power.

Figure 5:
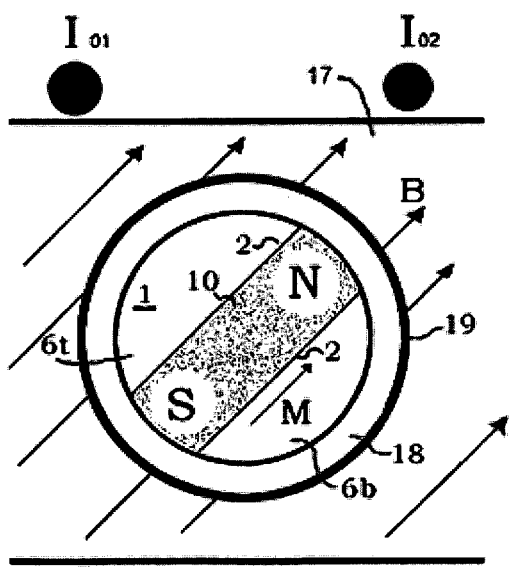
FIG. 5 is a cross-sectional view of a ferromagnetic bipolar sphere with an equatorial flat reflecting surface. This sphere is one of a multitude of optical elements, which are a major constituent of an optical switching ensemble.

FIG. 5 is a cross-sectional view of a rotatable element 1 with ferromagnetic material 10 with induced North pole N and South pole S, of dipole M, lined up as shown with an approximately uniform magnetic flux density B. This magnetically charged bipolar ball 1 with top 6t and bottom 6b, has mirrors 2 sandwiching ferromagnetic material 10. The mirrors 2 themselves may themselves be ferromagnetic. For a stronger dipole M, the ferromagnetic material 10 itself may be a permanent magnet, just as an electret 11 augments the induced electric dipole field d in the mirrors for the embodiment of FIG. 4. This ball inside a top transparent single sheet 17 is one of a multitude of optical elements 1, which are a major constituent of an optical switching ensemble. The element 1 is completely covered with a lubricating fluid 18 which is encapsulated inside a concentric cavity 19. Instead of voltages to produce an electric field as before, here currents I above and I' below are used to produce the magnetic alignment field B. A magnetic field generated by the four conductors nearest a desired element 1 controls its orientation as will be described next.

In the magnetic orientation mode of control, the induced and/or permanent magnetic dipole M in each ball is acted on by a torque τ, equal to the vector product of the magnetic dipole moment M, of the dipole and the magnetic field $H=B/\mu$, where $\mu$ is the permeability of the medium:

τ=M×H which has the magnitude MH sin θ, where θ is the angle between the M and H vectors. If there is no other torque acting on the ball and friction is negligible, the ball will come to rest at the null torque orientation where the vectors M and H are parallel, and the dipole moment lines up with the magnetic field lines in equilibrium. The classic example of this is a powder of iron filings which line up with field lines when placed near a permanent magnet. Orientation of the magnetic field can be controlled by small magnetic circuits with one or more coils placed around the ball mirror. In the most general case three orthogonal coils whose currents are controlled by electronic means can provide for three independent orthogonal components of the magnetic field and thus for arbitrary orientation of the ball. This can most easily be achieved by different means, one of which is by using a high permeability material such as mu metal to route the magnetic field lines to the desired position around the ball. The ball would be in the gaps of the magnetic circuits and they would be arranged so that the field produced by each are orthogonal to the fields of the other circuits at the position of the rotating ball. The magnetic ball would rotate to line up with the net vectorial external field, which can be quickly changed for each switching operation.

Figure 6:
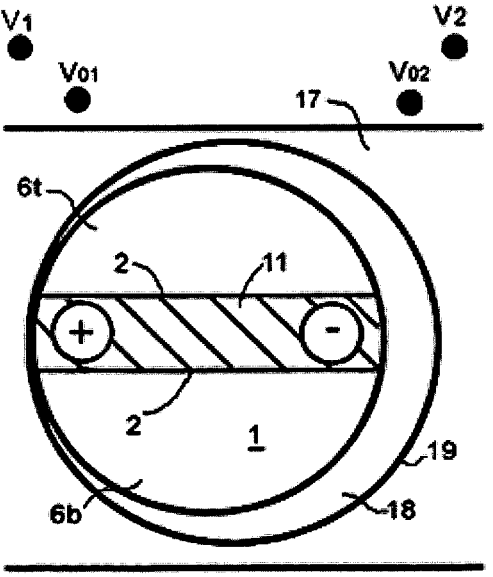
FIG. 6 is a cross-sectional view of a rotatable element, with an electret dipole sandwiched between induced dipole micro-mirrors, in a holding mode between alignments.

FIG. 6 is a cross-sectional view of a rotatable element 1 with an electret dipole 11 sandwiched between induced dipole micro-mirrors 2, in a holding mode between alignments. After alignment of a rotatable element 1, a translational thrust electric field can be applied which brings one side of the electret (the positive side in the case shown) closer to the cavity wall so that a net image charge attractive force holds the ball in fixed orientation permitting the alignment electric field to be switched off. The translational-thrust electric field can be supplied by additional electrodes which are electrically isolated by insulating layers from the electrodes shown. In the case shown, these additional electrodes apply voltages V2>V1, V2'>V1', V1=V1', and V2=V2'. The translational thrust electric field need not be applied on an individual basis to each element 1, but may be applied to large groups of balls collectively. The translational thrust electric field is reversed to free each element 1 from its contact with the wall of the concentric cavity 19, to be free to rotate. After rotation, the elements 1 are again driven by the translational thrust electric field for holding against the walls of the concentric cavities 19 with the balls 1 retaining their new orientation.

Another way to "hold" the chosen alignment angle i.e. tilt angle of the rotatable elements 1 is also by mechanical pressure on the single sheet as by piezoelectric effect, and/or friction. A holding effect can be achieved by slightly deforming the cavities 19 or voids 16 so that they take on an asymmetrical shape which slightly pinches the elements 1 with frictional forces. The alignment electric field is applied for rotation of the elements 1 when the frictional pinching force is removed. Deformation and restoral of the wall of the cavities 19 can be achieved by a pulsed piezo-electric device in contact with the top transparent single sheet 17.

Thus during the interval between alignments, the alignment voltages may be switched off to conserve power. The two sheet concentrator of U.S. Pat. No. 6,612,705 (of which one of the present inventors is a co-inventor), uses a plenum to slightly force the two containment sheets apart, to free the elements 1 when a new alignment is desired. The one sheet of the instant invention with encapsulated balls differs substantially from the two sheet invention of U.S. Pat. No. 6,612,705 so that other means are used for "HOLDING" the rotatable elements 1 between alignments.

FIG. 7 is a cross-sectional view of a rotatable element 1 pressed against the wall of a cavity 19 in a holding mode between alignments, with an induced dipole micro-mirror 2, which element 1 is surrounded with a lubricating liquid 18. The translational thrust electric field provided by the voltage sources V1, V2, V1', and V2' forces the elements 1 up against, and to have frictional contact with, the proximate portion of the cavity in the sheet. This can be achieved by using elements 1 with a non-uniform surface texture, that is, smoother in one hemisphere than in the other. Even without a frictional effect, pressing the element 1 into close contact with the wall of the cavity 19 brings a Van der Waals force of attraction into play between the element 1 and the wall of the cavity 19.

Another non-frictional method is to hold the elements 1 in place against the walls of each cavity 19 by means of geometric constraints. If slightly elipsoidal elements 1 are used, the elements 1 will offer greater resistance to rotation when held against the cavity walls 19, but can rotate easily when allowed to float in their cavity.

Similar holding capability can also be provided for the magnetic elements 1 of FIG. 5. In this structure, the magnetic elements 1 are translationally thrust electromagnetically to the wall of the cavity 19. The magnetic elements 1 can be held against the walls of the cavities 19 by similar methods to that of electric elements to prevent rotation as described in conjunction with FIG. 6.

Furthermore a holding capability for either magnetic or electrostatic elements 1 can also be achieved by having the surface area of one Zeta potential of the top material 6t (hemisphere or hemicylinder) of the particles larger than the surface area of the other, different Zeta potential bottom material 6b of the elements 1. This will create, in cooperation with the liquid 18, a net electrostatic charge on the particles which will provide a memory affect by causing the particles to be pushed against a wall of each cavity in the presence of a translational thrust electric field acting independently of the alignment field.

FIG. 8 is a schematic top view showing an electronic control grid 33 for matrix addressing of the rotational alignment of the mirrored elements 1. This grid 33 can be laid on the bottom of the sheet 17, on the top and bottom of sheet 17, on the top of sheet 17 with a ground plane on the bottom of sheet 17, etc. In order to avoid having several similar looking figures, this schematic may be thought of as a representation of any of several addressing arrays. It may be a wire grid array with the vertical wires on top of sheet 17, and the horizontal wires on the bottom of sheet 17. It may be an actual connected grid with Thin Film Transistors (TFTs) at the junctions. In this case it is preferable to use Polymer based TFTs for flexibility. The grid 33 is preferably a segmented array for the production of nearly uniform fields with each square being a separate insulated slab. In this case, the horizontal and vertical lines represent insulation between adjacent segments or slabs. Where necessary, the grid or slabs may be made of a thin conducting alloy of Indium/Tin Oxide (ITO) that is transparent. The common element of all of these electrostatic embodiments is the ability to impress the voltage Vij at the ij th node either statically or by means of a travelling wave. To minimize power dissipation, it is desirable to make resistive components 21 highly resistive so that a given voltage drop is accomplished with a minimum of current flow and hence with a minimum of power dissipation.

As previously described, the elements 1 are capable of rotating in any direction (two-axis response) in responding to a selectively applied electric field by the electronic control grid 33. The electronic control grid 33 is made of resistive components 21. In one embodiment, the elements 1 are sandwiched between the resistive electronic control grid 33 and a transparent ground plane. The orientation of the elements 1 is determined by controlling the voltages V at the nodes of the grid such as those shown $V_{00}$, $V_{01}$, $V_{02}$, $V_{10}$, $V_{11}$ with voltage Vij at the ij th node. The voltage Vij can be controlled by a small inexpensive computer with analog voltage outputs. The electronic control grid 33 is similar in construction and function to analogous grids used in personal computer boards, in flat panel monitors, in Gyricon displays, and in E-ink displays. Similarly, small offset ferritic current loops around each cell can provide local magnetic fields for the orientation function of elements with magnetic dipoles to line up with the net external magnetic vector.

Application of a voltage between successive nodes can produce an electric field in the plane of the planar minimirror. Application of a voltage between a node and the ground plane can produce an electric field perpendicular to the planar micro-mirror array to control the orientation angle of the active reflecting/switching micro-mirrors. In the case of elements 1 which contain a combination of orthogonal electric and magnetic dipoles, the orientation function may be separated for orientation in the plane and orientation perpendicular to the plane by each of the fields.

In the magnetic case, each square represents a current loop where adjacent loops are electrically isolated from each other. Orientation of the magnetic field and hence alignment of the balls can be controlled by small magnetic circuits with one or more current loops (coils) placed around each mirrored ball. In the most general case three orthogonal coils whose currents are controlled by electronic means can provide for three independent orthogonal components of the magnetic field and thus for arbitrary orientation of a ball. This can most easily be achieved by different means, one of which is by using a high permeability ferritic material such as mu metal to route the magnetic field lines to the desired position around the ball. The ball would be in the gaps of the magnetic circuits and they would be arranged so that the field produced by each is orthogonal to the other fields at the position of the rotating ball. The magnetic ball rotates to line up with the net vectorial external field, which can be easily changed for each new alignment.

FIG. 9 is a cross-sectional view of a mirrorable element 1 of transparent top 6t and transparent or opaque bottom 6b, which is a cell filled with a colloidal suspension of dispersed electric particles 8 or ferromagnetic particles 10 dispersed in a transparent fluid 70 in top 6t. A rigid flat surface 2b is in the midplane (equatorial plane) of the rotatable element 1 upon which the particles 8 or 10 can be laid down to form a mirrored surface. The element 1 is immersed in a lubricating fluid 18, which is confined inside the cavity 19 in a top transparent single sheet 17. Fluid 70 may be the same fluid as the transparent fluid 18. Also shown are the matrix addressing control voltages $V_{01}$, $V_{02}$, $V'_{01}$, and $V'_{02}$.

Figure 10:
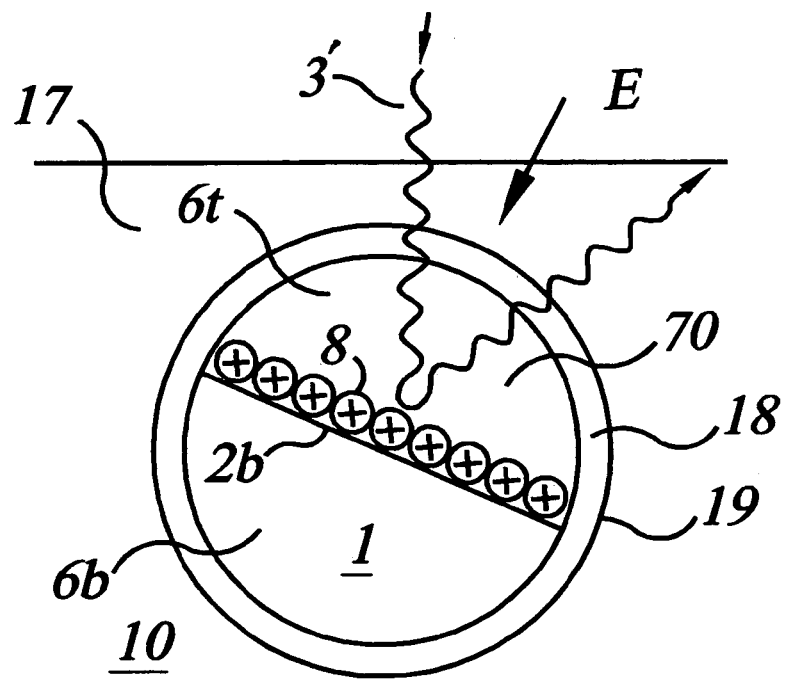
FIG. 10 is a cross-sectional view of a mirrorable electric fluid cell with a mirror formed from a colloidal suspension of dispersed shiny electrical particles in the fluid. This cell is one of a multitude of optical elements which are a major constituent of an optical switching ensemble.

FIG. 10 is a cross-sectional view of a mirrorable element 1 of transparent top 6t and transparent or opaque bottom 6b, which as shown is a cell filled with a colloidal suspension of dispersed shiny electrical particles 8, shown here to be positive +, but which may be negative. This cell is one of a multitude of optical elements 1 which are a major constituent of an optical switching ensemble. This electrophoretic mirror formation utilizes particles 8 that are electrically charged, polarized, or polarizable, and highly reflecting in large aggregate form, but may be transparent when dispersed in the transparent fluid 70 in the top 6t, when they are considerably less than the wavelength of the incident radiation i.e. <<4000 Å ($4 \times 10^{-7}$ m). In the case when these particles 8 are polarized, or polarizable, the particles 8 are coated to prevent aggregation in the zero electric field case. When a focussing external electric field E is applied, the particles aggregate to form a mirror on the rigid surface 2b perpendicular to the applied field, whose direction can be changed as is described above in conjunction with the permanently formed mirrored balls. It is preferable to utilize a fluid 18 surrounding element 1 whose index of refraction matches element 1 (the clear hemisphere or clear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18, except that it may have a different density. Fluid 18 is confined by the cavity 19 in the single sheet 17.

The orientation of this flat mirrored surface can be controlled by an electric field E to reflect light 3'. Until the electric field E is applied, as an optional capability the particles 8 and the fluid 70 can function as a transparent window when the particles 8 are nanosize i.e. much smaller than the wavelength of the incident light and the fluid 70 is transparent or translucent while they are dispersed in the fluid 70. For the case of dispersed transparency, the particles 8 should be <<4000 Å ($4 \times 10^{-7}$ m). This cell is one of a multitude of optical elements 1 which focus light onto a receiver. The particles 8 may include a wide variety of electomagnetically interactive materials such as electret, optoelectric, conducting, thermoelectric, electrophoretic, resistive, semiconductive, insulating, piezoelectric, or spin (e.g. spin glass) materials.

The element 1 cells are typically sandwiched between a transparent top electrode (e.g. Indium Tin Oxide) and a smaller bottom electrode so that the electric field lines converge toward the transparent bottom electrode. When the bottom electrode is positive, or there is no electric field E the particles are dispersed in widely separated positions in the fluid 70 presenting either a transparent, translucent, non-reflecting, or diffuse reflection surface to an incident light beam. When the bottom electrode is negative, the particles move together toward the rigid surface 2b and form a tight mirrored surface on rigid surface 2b. This migration with increased density at the mirrored surface 2b forms a suitable reflecting micro-mirror.

Figure 11:
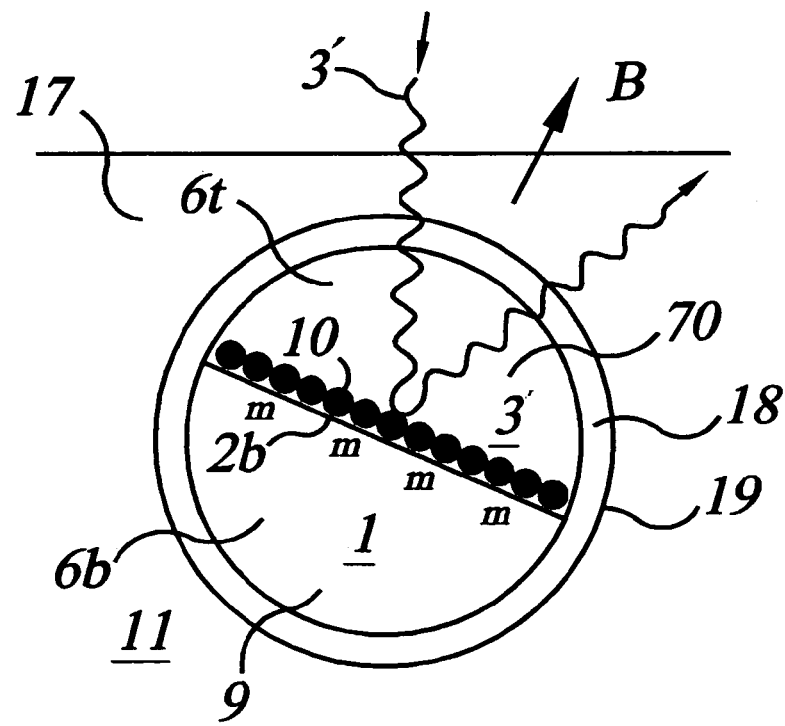
FIG. 11 is a cross-sectional view of a mirrorable ferrofluid cell with a mirror formed from a colloidal suspension of shiny ferromagnetic particles in the fluid. This cell is one of a multitude of optical elements which are a major constituent of an optical switching ensemble.

FIG. 11 is a cross-sectional view of a mirrorable element 1 of transparent top 6t and transparent or opaque bottom 6b, which is a ferrofluid cell filled as shown with a colloidal suspension of dispersed shiny magnetic particles 10, also indicated by the symbol m. This cell is one of a multitude of optical elements 1 which focus light onto a receiver. This electrophoretic mirror formation utilizes ferromagnetic particles 10 that are permanently magnetically polarized, or polarizable, and highly reflecting in large aggregate form, but may be transparent when dispersed in the transparent fluid 70 in the top 6t, when they are considerably less than the wavelength of the incident radiation i.e. <<4000 Å ($4 \times 10^{-7}$ m). In the case when these particles 10 are polarized, or polarizable, the particles 10 are coated to prevent aggregation in the zero magnetic field case. When a focussing external magnetic field B is applied, the particles aggregate to form a mirror on the rigid surface 2b perpendicular to the applied magnetic field, whose direction can be changed as is described above in conjunction with the balls with permanently formed mirrors. It is preferable to utilize a fluid 18 surrounding element 1 whose index of refraction matches element 1 (the clear hemisphere or clear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18, except that it may have a different density. Fluid 18 is confined by the cavity 19 in the single sheet 17.

The orientation of this flat mirrored surface can be controlled by the magnetic field B to reflect light 3'. Until the magnetic field B is applied, as an optional capability the magnetic particles 10 and the fluid 70 can function as a transparent window when the particles 10 are nanosize i.e. much smaller than the wavelength of the incident light and the fluid 70 is transparent or translucent while they are dispersed in the fluid 70. For the case of dispersed transparency, the magnetic particles 10 should be <<4000 Å ($4 \times 10^{-7}$ m). This cell is one of a multitude of optical elements 1 which focus light onto a receiver. The particles 10 may include a wide variety of electomagnetically interactive materials such as magnetic, ferromagnetic, paramagnetic, diamagnetic, or spin (e.g. spin glass) materials.

The element 1 cells are typically sandwiched in a focusing top magnetic field so that the magnetic field lines converge toward the rigid surface 2b. When there is no magnetic field B the particles are dispersed in widely separated positions in the fluid 70 presenting either a transparent, translucent, non-reflecting, or diffuse reflection surface to an incident light beam. When an inhomogeneous electromagnetic field B of increasing gradient is applied, the particles 10 are drawn to the region of increasing gradient and coalesce to form a flat reflecting mirror on rigid surface 2b. The magnetic particles move together toward the rigid surface 2b forming a tight mirrored surface. This migration with increased density at the mirrored surface 2b produces a suitable reflecting micro-mirror.

Once formed, the orientation of the flat mirrored surface can be controlled by the magnetic field B by rotation of the element 1 as described in conjunction with FIG. 5, or even an electric field as described in conjunction with FIG. 3, to properly reflect light 3. This cell is one of a multitude of optical elements 1 which focus the light 3 onto a receiver. The particles 10 are small enough to form a colloidal suspension, and are coated to prevent coalescence until B is applied.

Figure 12:
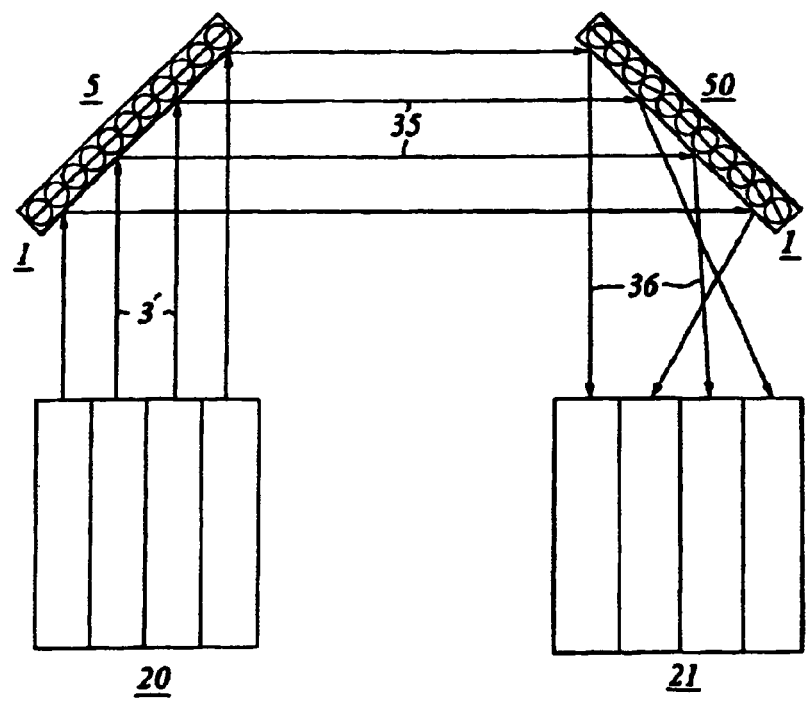
FIG. 12 is a cross-sectional illustration of a multi-channel reflection matrix switch which utilizes the ensemble of dynamic reflecting elements for switching operations.

FIG. 12 is a cross-sectional illustration of a multi-channel reflection matrix switch 5 which utilizes an ensemble of dynamic reflecting elements 1 for switching operations over a broad operational range of radiation frequencies from optical to microwave. Optical beams may be collimated by lenses or lasers. Microwave beams may be collimated by wave guides. The lenses, lasers, or wave guides are not shown, since these are well known to those versed in the art. Shown are N input channels 20, sending collimated radiation beams 3', to a reflection matrix switch 5. Said switch 5 selectively reflects said radiation beams 3, so that switched beams 35 are transmitted to a second reflector 50, shown here as a reflection matrix switch. For some applications, the second reflector 50 may also be an ordinary reflecting surface like a mirror, or even the receiving output channels. The signal from reflector 50 is transmitted to the output channels 21 by means of the reflected beams 36. The output channels 21 may thus be electrically isolated from the input channels 20 since there need be no direct electrical connection between them. The matrix switches 5 and 50 are controlled by input signals to an electronic control grid such as shown in FIG. 8.

Figure 13:
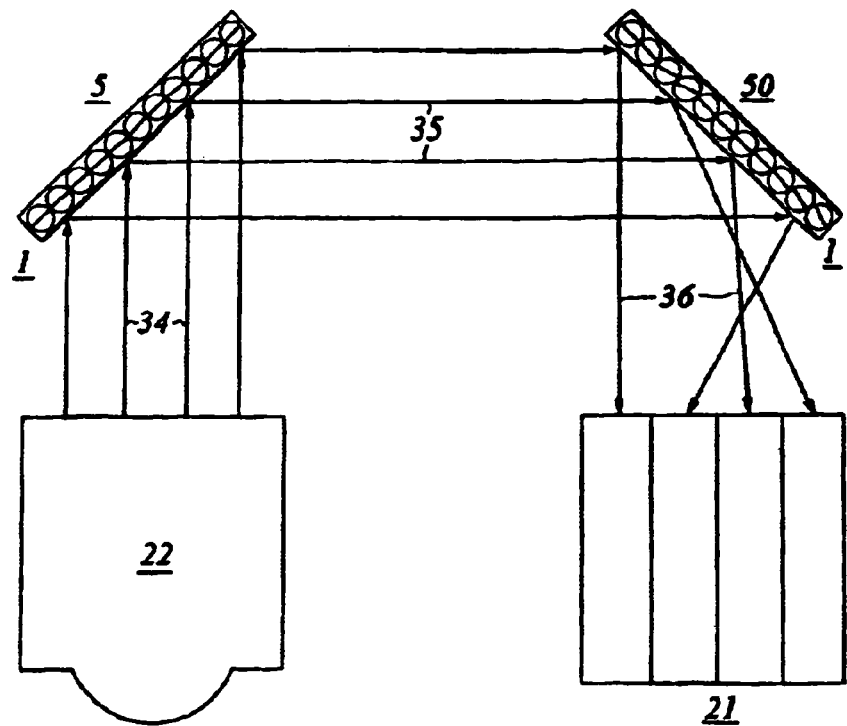
FIG. 13 is a cross-sectional illustration of a multi-channel refection matrix switch with an independent radiation source which utilizes the ensemble of dynamic reflecting elements for switching operations.

FIG. 13 is a cross-sectional illustration of a multi-channel refection matrix switch 5 which utilizes an ensemble of dynamic reflecting elements 1 for switching operations over a broad operational range of frequencies. Shown is an independent radiation source 22, sending a collimated beam 34, to a refection matrix switch 5 operated by electronic input channels to activate an electronic control grid such as shown in FIG. 8. Said switch 5 selectively reflects said radiation beam 34, so that a switched beam 35 is transmitted to a second reflector 50, shown here as a refection matrix switch. For some applications, the second reflector 50 may also be an ordinary reflecting surface like a mirror, or even the receiving output channels. The signal from reflector 50 is transmitted to the output channels 21 by means of the reflected beams 36. The output channels 21 may thus be electrically isolated from the input channels 20 since there need be no direct electrical connection between them. The matrix switch 50 is controlled by input signals to an electronic control grid such as shown in FIG. 8. The collimating lenses, lasers, or wave guides are not shown, since these are well known to those versed in the art.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims.

What is claimed is:

1. An electromagnetic radiation signal switch apparatus comprising:
    (a) a plurality of radiation input ports for receiving a plurality of radiation input signals, and a plurality of radiation output ports for collecting a plurality of output radiation signals;
    (b) an array of rotatable mirrored balls embedded in cavities in an optically transmissive sheet;
    (c) each of said mirrored balls encapsulated in a surrounding medium of an optically transmissive fluid lubricant;
    (d) linkage to rotate said mirrored balls;
    (e) said mirrored balls substantially reflecting at least a portion of said radiation input signals; and
    (f) microprocessor voltage signal means for establishing the linkage for selectively switching said mirrored balls from one orientation to another in order to direct the input signals to the output ports.

2. The apparatus of claim 1, wherein said linkage is an induced dipole.

3. The apparatus of claim 1, wherein said linkage is an electric dipole.

4. The apparatus of claim 1, wherein said linkage is a magnetic dipole.

5. The apparatus of claim 1, wherein said cavities maintain said mirrored balls in fixed orientation following rotational alignment.

6. An electromagnetic radiation signal switch apparatus comprising:
  (a) a plurality of radiation input ports for receiving a plurality of radiation input signals, and a plurality of radiation output ports for collect a plurality of output radiation signals;
  (b) an array of rotatable cells embedded in an optically transmissive sheet;
  (c) a receptive surface in each of said cells;
  (d) transparent fluid contained in said cells;
  (e) micro-particles dispersed in said fluid;
  (f) at least one formed rotatable mirror of said particles on said receptive surface;
  (g) a field to rotate said mirror;
  (h) said rotatatable mirror substantially reflecting at least a portion of said radiation input signals; and
  (i) microprocessor signal for switching said rotatable mirror from one orientation to another in order to direct the input signals to the output ports.

7. The apparatus of claim 6, wherein a dipole is induced in said formed rotatable mirror for rotation.

8. The apparatus of claim 6, wherein said field is electric.

9. The apparatus of claim 6, wherein said field is magnetic.

10. The apparatus of claim 6, wherein said sheet maintains said rotatable mirror in fixed orientation following rotational alignment.

11. A method of switching electromagnetic radiation signals by an array of mirrored reflectors, comprising the steps of:
  (a) providing a plurality of radiation input ports for receiving a plurality of radiation input signals, and a plurality of radiation output ports for collecting a plurality of output radiation signals;
  (b) providing a sheet with an optically transmissive surface;
  (c) placing the mirrored reflectors in the sheet;
  (d) surrounding said mirrored reflectors with a shell of a lubricating fluid in a cavity;
  (e) providing coupling for rotation of said mirrored reflectors; and
  (f) selectively switching said mirrored reflectors from one orientation to another with said coupling by means of a processing signal in order to direct the input signals to the output ports.

12. The method of claim 11, wherein said coupling is an induced dipole.

13. The method of claim 11, wherein said coupling is an electric dipole.

14. The method of claim 11, wherein said coupling is a magnetic dipole.

15. The method according to claim 11, wherein maintaining said mirrored reflectors in fixed orientation following rotational alignment occurs by interacting with each said cavity.

16. A method of switching electromagnetic radiation signals by an array of reflectors, comprising the steps of:
  (a) providing a plurality of radiation input ports for receiving a plurality of radiation input signals, and a plurality of radiation output ports for collecting a plurality of output radiation signals;
  (b) providing micro-particles dispersed in a fluid in cells in an optically transmissive sheet;
  (c) forming rotatable reflectors in said cells;
  (d) providing a coupling field to rotate said reflectors; and
  (e) reorienting said reflectors through establishing said coupling field to alter the switching mode, by means of a processing signal in order to direct the input signals to the output ports.

17. The method according to claim 16, wherein said field is electric.

18. The method according to claim 16, wherein said field is magnetic.

19. The method of claim 16 wherein said reflectors are ferrofluid reflectors.

20. The method according to claim 16, wherein maintaining said reflectors in fixed orientation following rotational alignment occurs by interacting with said sheet.

* * * * *